United States Patent
Feichtinger et al.

(10) Patent No.: US 8,985,986 B2
(45) Date of Patent: Mar. 24, 2015

(54) APPARATUS FOR GRANULATING HOT CUT

(75) Inventors: Klaus Feichtinger, Linz (AT); Manfred Hackl, Linz-Urfahr (AT); Gerhard Wendelin, Linz (AT)

(73) Assignee: EREMA Engineering Recycling Maschinen und Anlagen Gesellschaft m.b.H., Ansfelden (AT)

( * ) Notice: Subject to any disclaimer, the term of this patent is extended or adjusted under 35 U.S.C. 154(b) by 0 days.

(21) Appl. No.: 13/131,190

(22) PCT Filed: Nov. 18, 2009

(86) PCT No.: PCT/AT2009/000445
§ 371 (c)(1),
(2), (4) Date: Aug. 4, 2011

(87) PCT Pub. No.: WO2010/075597
PCT Pub. Date: Jul. 8, 2010

(65) Prior Publication Data
US 2011/0287123 A1    Nov. 24, 2011

(30) Foreign Application Priority Data

Dec. 16, 2008  (AT) ................. A 1965/2008

(51) Int. Cl.
*B29B 9/06*      (2006.01)

(52) U.S. Cl.
CPC .................. *B29B 9/06* (2013.01); *Y10S 425/06* (2013.01); *Y10S 425/23* (2013.01)
USPC ............... 425/70; 425/68; 425/191; 425/196; 425/307; 425/313; 425/546; 425/DIG. 60; 425/DIG. 230; 264/142

(58) Field of Classification Search
CPC .......... B29B 9/06; B29B 9/065; B29C 47/12; B29C 47/30; B26D 7/2614; B28B 11/14; B28B 11/16
USPC ........... 425/67, 142, 196, 307, 308, 310, 311, 425/313, 382 R, 463, 70, 546, DIG. 60, 425/DIG. 230, 191, 68; 264/142, 169
See application file for complete search history.

(56) References Cited

U.S. PATENT DOCUMENTS 3,564,650 A * 2/1971 Irving ......................... 425/72.1
3,673,298 A * 6/1972 Miler ............................ 264/142
3,685,751 A * 8/1972 Anders ......................... 425/171
(Continued)

FOREIGN PATENT DOCUMENTS

DE    197 20 722 A1    11/1998
DE    203 00 009 U1    5/2004
(Continued)

*Primary Examiner* — Seyed Masoud Malekzadeh
(74) *Attorney, Agent, or Firm* — Kilpatrick Townsend & Stockton LLP

(57) ABSTRACT

An apparatus for granulating hot cut, in particular thermoplastic resin material, the material strands melted by an extruder being knocked off into granule pellets in a granulating housing by rotating knives disposed on a shaft driven by way of a motor, the granule pellets being picked up by a cooling medium flowing in the granulating housing, cooled and discharged out of the granulating housing, characterized in that a flow opening establishing a continuous fluid connection between the inside of the granulating housing and the outside environment is designed between the shaft and the region of the granulating housing in which the shaft penetrates the granulating housing.

13 Claims, 2 Drawing Sheets

(56) References Cited

U.S. PATENT DOCUMENTS

| | | | |
|---|---|---|---|
| 3,792,950 A * | 2/1974 | Cuff | 425/313 |
| 3,912,434 A * | 10/1975 | Nagahara et al. | 425/142 |
| 4,038,002 A * | 7/1977 | Inaba et al. | 425/136 |
| 4,300,877 A * | 11/1981 | Andersen | 425/67 |
| 4,461,737 A * | 7/1984 | Voss | 264/142 |
| 4,529,370 A * | 7/1985 | Holmes et al. | 425/142 |
| 4,764,100 A * | 8/1988 | Lambertus | 425/67 |
| 5,059,103 A * | 10/1991 | Bruckmann et al. | 425/67 |
| 5,110,523 A * | 5/1992 | Guggiari | 264/40.5 |
| 5,190,768 A * | 3/1993 | Ishida et al. | 425/67 |
| 5,223,279 A * | 6/1993 | Lambertus | 425/186 |
| 5,360,585 A * | 11/1994 | Ishida et al. | 264/40.1 |
| 5,435,713 A * | 7/1995 | Yamasaki et al. | 425/311 |
| 5,747,077 A * | 5/1998 | Yoshida et al. | 425/183 |
| 5,879,720 A * | 3/1999 | Yoshida et al. | 425/183 |
| 5,948,336 A * | 9/1999 | Yoshida et al. | 264/142 |
| 6,220,847 B1 * | 4/2001 | Yoshida et al. | 425/67 |
| 6,332,765 B1 * | 12/2001 | Spelleken | 425/67 |
| 6,551,087 B1 * | 4/2003 | Martin | 425/67 |
| 6,887,969 B2 * | 5/2005 | Day et al. | 528/196 |
| 6,925,741 B2 * | 8/2005 | Eloo et al. | 425/67 |
| 7,033,152 B2 * | 4/2006 | Eloo et al. | 425/67 |
| 7,255,547 B2 * | 8/2007 | Brandstaetter et al. | 425/3 |
| 7,273,365 B2 * | 9/2007 | Murb | 425/67 |
| 7,338,273 B2 * | 3/2008 | Konno et al. | 425/313 |
| 7,393,484 B2 * | 7/2008 | Martin | 264/142 |
| 7,524,178 B2 * | 4/2009 | Rosse et al. | 425/313 |
| 2003/0185923 A1 * | 10/2003 | Martin | 425/67 |
| 2008/0164352 A1 * | 7/2008 | Schulz | 241/38 |
| 2009/0233097 A1 * | 9/2009 | Kolich et al. | 428/402 |

FOREIGN PATENT DOCUMENTS

| | | |
|---|---|---|
| DE | 103 02 645 A1 | 7/2004 |
| WO | WO 2006/122340 A1 | 11/2006 |

* cited by examiner

APPARATUS FOR GRANULATING HOT CUT

CROSS-REFERENCES TO RELATED APPLICATIONS

This application is a National Stage of International Application No. PCT/AT2009/000445 filed Nov. 18, 2009, and which claims the benefit of Austrian Patent Application No. A 1965/2008, filed Dec. 16, 2008, the disclosures of which are incorporated herein by reference.

BACKGROUND OF THE INVENTION

The invention concerns an apparatus for granulating according to the preamble of claim 1.

Granulating apparatuses for granulating hot cut, wherein the knocked off granulates are picked up, cooled and discharged by a quickly flowing fluid film or fluid ring, for example water, are known in different embodiment forms. In the case of these apparatuses a critical area is the sealing of the knife driving shaft against the water rotating in the granulating housing. An escape of the water from the area between the shaft and the granulating housing should be prevented since the water otherwise could undesirably reach the area of the motor. For this purpose different sealings are known from prior art that seal the shaft that is rotating about its axis reasonably well.

Still more difficult the situation becomes when the shaft rotates not only about its own axis but additionally is also to be axially displaceable in order to adjust the spacing of the knifes to the perforated plate and to adjust the cutting pressure of the knifes optimally. Such granulating apparatuses, whereby the shaft that supports the knife is adjustable in the axial direction, are likewise known in a plurality of implementations. In these cases the sealing must not only prevent a water escape and endure the rotation of the shaft in the bearing, but also assure in a lasting manner the axial adjustability.

Frequently according to prior art the shaft of the knife head is thereby supported in an axially displaceable sleeve. By these means the desired contact pressure of the knifes against the perforated plate can also be adjusted. The torque is transmitted to the knife driving shaft usually by means of a toothed clutch. If water is utilized as a cooling medium for the knocked off granulate particles, which is usually the case, the knife driving shaft has to be sealed relative to the housing in order to prevent an escape of water through the bearing Hereby friction-dependent difficulties arise. The axial displacement of the knife driving shaft also causes a displacement of the running surface of a sealing ring that implements the sealing of the water, so that the friction conditions change continuously. In a similar way the friction parameters of the toothed clutch change also during the displacement of the knife driving shaft. Furthermore one should take note that the sleeve that forms the support runs in a slide bearing that has to be greased. Here also different friction parameters arise at different times because the greasing means (usually oil) becomes after some time more or less gummy so that a relatively high breakaway torque is produced which is in contrast to the demand that usually only minor axial friction is desired. Beyond that a sleeve bearing is contingent on a certain effort. A dragging support of the shaft in the housing by means of two sealing rings with an oil film positioned in between also has the disadvantage that the lifetime of a seal ends at some point and the sealings become porous and leaking, the oil film escapes and subsequently becomes affixed to the shaft and an axial displacement capability is no longer assured.

For the solution of this problem diverse implementations are known from prior art, for example the substitution of a sleeve support of the shaft by means of a motor bearing. Furthermore different suspensions of the motors were developed, for example in the DE 10 302 645 or the WO 2006/122340, in order to assure the axial displacement capability of the knife driving shaft for the long term.

BRIEF SUMMARY OF THE INVENTION

It is now the object of the invention at issue to create an apparatus of the type described above whereby in a constructively simple and cost-efficient manner the seal tightness in the area of the shaft is assured.

This object is met according to the characteristics of claim 1. It is hereby provided that between the shaft and that area of the granulating housing in which the shaft penetrates the granulating housing a flow-through opening is implemented that establishes a fluid connection between the interior of the granulating housing and the outer environment.

This solution is based on the surprising realization that by means of the discharge of the flowing cooling medium from the granulating housing or by means of the relatively quick water flow, analogous to a water jet pump in the granulating housing, a certain vacuum forms relative to the outer environment. By means of this vacuum the surrounding air is drawn from the outside through the flow-through opening into the interior of the granulating housing. By means of the air current that is directed toward the interior the cooling medium can no longer escape to the outside by this path, and namely next to or along the shaft, against the countervailing air current. It has surprisingly turned out that this principle functions satisfactorily already at very low vacuum in the granulating housing or at very low vacuum differences.

For this reason or through the conscious implementation of a leakage or a location that is not seal-tight or an unobstructed opening, at a position where up until now always the highest seal tightness, with at the same time axial mobility, was demanded, a sealing of the shaft by means of sealing rings or greasing means for the prevention of the escape of water between shaft and housing is now no longer required and one can fall back on not so well-sealing, harder, but therefore more long-lived seals or the seal can even be omitted completely. The seal tightness between the shaft and the granulating housing is nonetheless assured and no water can escape.

By this constructively very simple method a granulating apparatus can thereby be created that is on the one hand seal-tight against the escape of the cooling medium in the critical area of the shaft and in addition can do without the application of expensive and susceptible seals.

Additional advantageous embodiment possibilities or embodiment forms are determined through the characteristics of the dependent claims:

According to a preferred embodiment the shaft is adjustable or displaceable axially in the direction of its longitudinal axis so that the knifes knock off the granulate particles with optimal cutting pressure. Also in the context of this embodiment form of an apparatus for granulating hot cut, whereby the shaft not only rotates about its own axis but additionally is also axially adjustable, the apparatus according to the invention offers significant advantages. On the one hand the seal tightness remains secure also in the case of a shaft that is axially adjustable in such a manner. In addition, as was remarked as part of the introduction, the sealing of an axially adjustable shaft has not been satisfactorily solved based on prior art, particularly in regard to the low service life of the seals or because of the limited displacement capability. Exactly the fact that in the case of the embodiment form according to the invention wear-prone seals are no longer required provides the additional advantage that the axial displacement capability of the shaft for the purpose of the adjustment of the knife head is permanently assured.

According to a preferred embodiment form the shaft is completely and on all sides encompassed by the flow-through opening in the form of a ring-shaped gap or a cylinder ring or in the form of a cylinder casing and the shaft penetrates the granulating housing without contact or a ring-shaped open space is recessed. By these means the friction of the now freely running and no longer dragging shaft is lowered, which in turn results in a material and energy saving.

Furthermore it is in this context advantageous if the shaft and/or the motor are supported outside of the granulating housing. By these means, while maintaining the seal tightness and the service life, the friction of the shaft is minimized and the effectiveness of the air current is increased. Alternatively the shaft 9 could, if applicable also, be supported via a bearing that is disposed in the interior of the granulating housing 1.

In a further embodiment of the invention it can be advantageous if in the area of the penetration of the shaft into the granulating housing in the interior of the granulating housing a flange element that encompasses the shaft is disposed, whereby the flow-through opening is implemented in the flange element and the surrounds the shaft in a cylinder casing shape or in the form of a ring gap. By means of the flange element the entrance of cooling medium is additionally impeded. In addition the flange element can serve the purpose of being a guide for the shaft.

According to a preferred embodiment form the flow-through opening is permanently open or provides a permanent gas entrance or gas penetration with the result that possible plug-ups because of water or granulate particles can be avoided.

Furthermore it is advantageous if the flow-through opening is free of sealing agents, in particular free of one or several seal rings and/or a greasing means film. By means of the complete omission of such additional sealing means the apparatus—while maintaining the seal tightness at the same time—is, while lowering the friction and improving the axial displacement capability, less interference prone, more cost effective, as well as simpler to build.

According to an additional preferred embodiment form a back-flow thread that encompasses the shaft and conveys toward the interior can be supported or disposed in the flow-through opening, preferably in the flange element, whereby a certain failover against possible escape of water in the case of the plug-up of the flow-through opening or similar exists and water entering the gap is again conveyed back into the granulating housing also without air current.

A preferred embodiment of the apparatus is provided when the apparatus is implemented as a as such known hot cut granulating apparatus, wherein in the granulating housing a circulating fluid ring or fluid casing, for example by water, water-glycol etc. is implemented, wherein the velocity of the water current can be adjusted in such a manner that a sufficiently strong air current is established through the flow-through opening in order to prevent an escape or penetration of water through the flow-through opening. Through the increased flow velocity of the cooling medium or during the escape of the cooling medium from the housing an increased vacuum or an increased low pressure is generated and the seal tightness of the system is increased.

Alternatively or additionally a vacuum pump can be provide or be connected to the granulating housing that establishes the vacuum in the granulating housing at least partially. Therefore even in the case of a water stream that is switched-off or too low the seal tightness can be maintained.

In this context it is advantageous if the granulating housing is stable against vacuum and if the granulating housing is designed in such a manner that the leaks of the granulating housing are so minor that always sufficient air is drawn through the flow-through opening into the interior of the granulating housing and a sufficiently strong air current is established through the flow-through opening in order to prevent an escape or penetration of water through the flow-through opening. In particular it is advantageous if the granulating housing is implemented during operation, aside from the flow-through opening and the supply and discharge lines for the cooling medium, in a gas tight manner. The effect of the flow through the flow-through opening is thereby maximized.

Additional characteristics and advantages of the invention arise from the description of advantageous embodiment examples that are schematically represented in the illustrations.

DETAILED DESCRIPTION OF THE INVENTION

Figure 1:
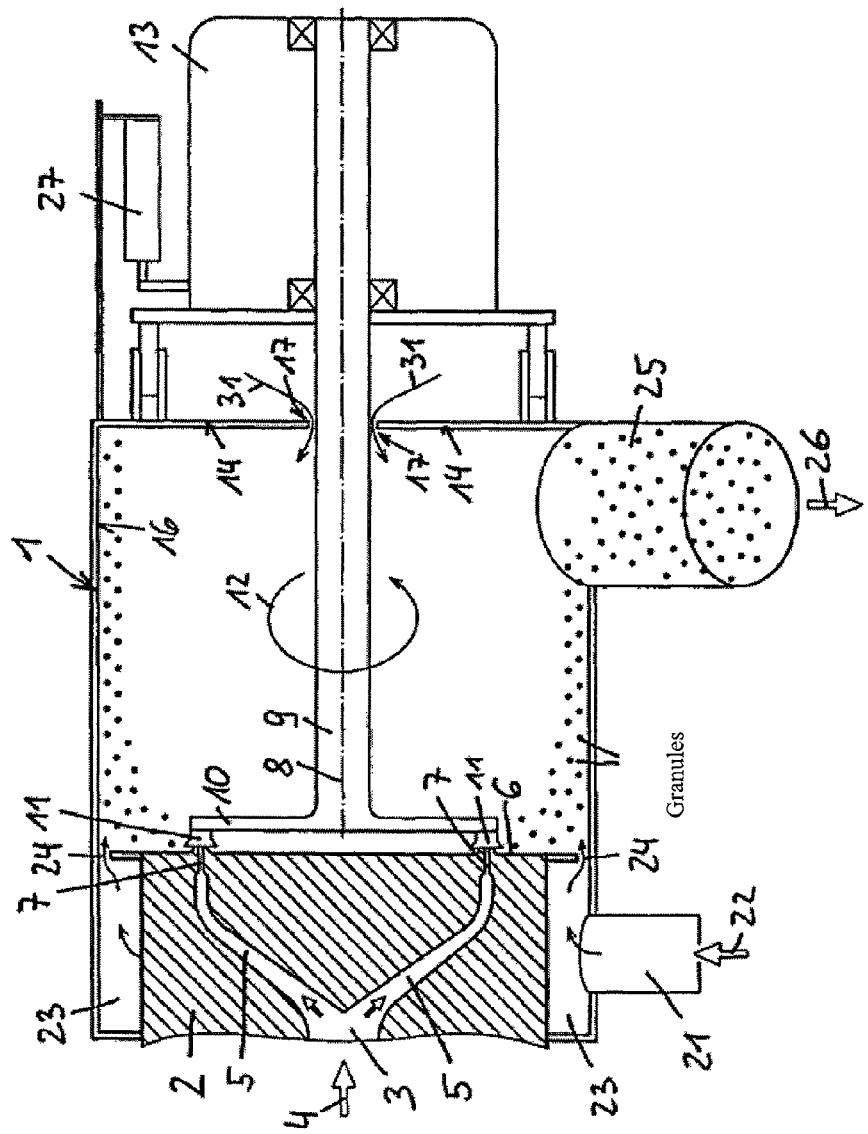
FIG. 1 shows the apparatus according to the invention.

The advantageous embodiment form of an apparatus according to FIG. 1 features a cylindrical granulating housing 1 that is delimited on its side, particularly the one facing an extruder, by a perforated plate 2 and, on its opposite front face, by an end wall 14. In the perforated plate 2 is a supply channel 3 provided for the plasticized material to be granulated or the melt, in particular thermoplastic resin material, that flows in the direction of the arrow 4 from the supply channel 3 into several distributor channels 5 that end on the front face 6 of the perforated plate 2 in nozzles 7 that are disposed in a circle and at even spacings around the central longitudinal axis 8 of the granulating housing 1.

This longitudinal axis 8 forms at the same time the rotation axis of a shaft 9 that supports on its end that is facing the perforated plate 2 a knife head 10 that is equipped with a plurality of knifes 11 that during the rotation of the shaft 9 about its axis in the direction of the arrow 12 graze over the openings of the nozzles 7 and thereby knock off to granulate particles the strand-like plastic mass that is pressed out of the nozzles 7. The rotation of the shaft 9 is effected by a motor 13 that is disposed outside of the granulating housing 1 behind the end wall 14.

In order to assure that the knifes 11 always graze across the openings of the nozzles 7 with the desired contact pressure or the optimal cutting pressure the shaft 9 is in the case of the present embodiment form, in particular including the motor 13 that drives it, movable or adjustable in the axial direction of the longitudinal axis 8 relative to the granulating housing 1. This purpose in this case serves an adjustment apparatus 27 that can be implemented by an actuator of an arbitrary kind, for example via threads, a magnet, by means of an actuator motor etc. In the radial direction the shaft 9 is not or not significantly movable. The adjustment apparatus in the case of the embodiment form according to FIG. 1 is attached to the granulating housing 1 and engages the housing of the motor 13, the axial adjustment capability of the shaft 9 can however also be implemented differently.

During operation a cooling medium, in particular cooling water or a mixture of water and glycol, is introduced into the interior of the granulating housing 1. This cooling water is supplied tangentially via a line 21 in the direction of the arrow 22 and flows into a ring-shaped space 23 that surrounds the perforated plate 2, from said space it enters through at least one opening 24 into the interior of the granulating housing 1, sweeps along the interior side of the wall 16 in the form of a water film or water ring and thereby picks and cools the granulate particles that were knocked off by the knifes 11 immediately after their creation, so that a baking-together of these particles is prevented. The cooled granulate particles are discharged together with the cooling water via the discharge line 25 in the direction of the arrow 26 from the granulating housing 1.

In the case of the apparatus according to FIG. 1 this concerns primarily a known granulating hot cut apparatus wherein the removal of the granulate particles takes place by means of the rotating water film.

The shaft 9 penetrates the granulating housing 1 in the central middle area of the end wall 14. The shaft 9 is not supported in the end wall 14 of the granulating housing 1 but is primarily supported by the motor 13. The shaft 9 penetrates the granulating housing 1 free of contact and therefore friction-free or is spaced apart from the granulating housing 1.

The area between the shaft 9 and the granulating housing 1 if free of a dragging sealing, meaning no sealing is present in this area and namely neither sealing rings nor greasing mean films or such like. Between the interior of the granulating housing 1 and the outer environment a permanently open flow-through opening 17 is therefore implemented through which air can flow according to arrow 31 from the outside into the interior of the granulating housing 1. The flow-through opening 17 abuts immediately against the shaft 9 or leads directly along the shaft 9 or the shaft 9 is encompassed by the flow-through opening 17 completely and from all sides in a cylinder-casing shape. The flow-through opening 17 features the form of a cylinder ring or a ring gap or an open space of such kind is recessed.

By means of the discharge of the flowing cooling medium out of the granulating housing 1 (arrow 26) or the relatively quick water flow, in particular at discharge 25, a certain vacuum in comparison to the outer environment is implemented in the granulating housing 1 analogous to a water jet pump. The vacuum is also influenced by the design of the discharge 25 and the conveyance of the cooling medium in a sealed system, for example a hose.

Alternatively or in addition the vacuum could also be at least partially or in support be produced via a switchable vacuum pump. The granulating housing 1 therefore has to exhibit a certain stability against light to medium vacuum.

By means of this vacuum the surrounding air is drawn according to arrow 31 from the outside through the flow-through opening 17 along the shaft 9 into the interior of the granulating housing 1. By means of this air current 31 that is directed toward the interior, the cooling medium cannot escape through the flow-through opening 17 against the air current 31 to the outside. It has surprisingly turned out that this principle functions satisfactorily already at very low vacuum in the granulating housing 1. The area where the shaft 9 penetrates the granulating housing 1 is therefore sealed against the escape of cooling medium, whereby in this area the application of expensive and failure-prone seals can be omitted.

Figure 2:
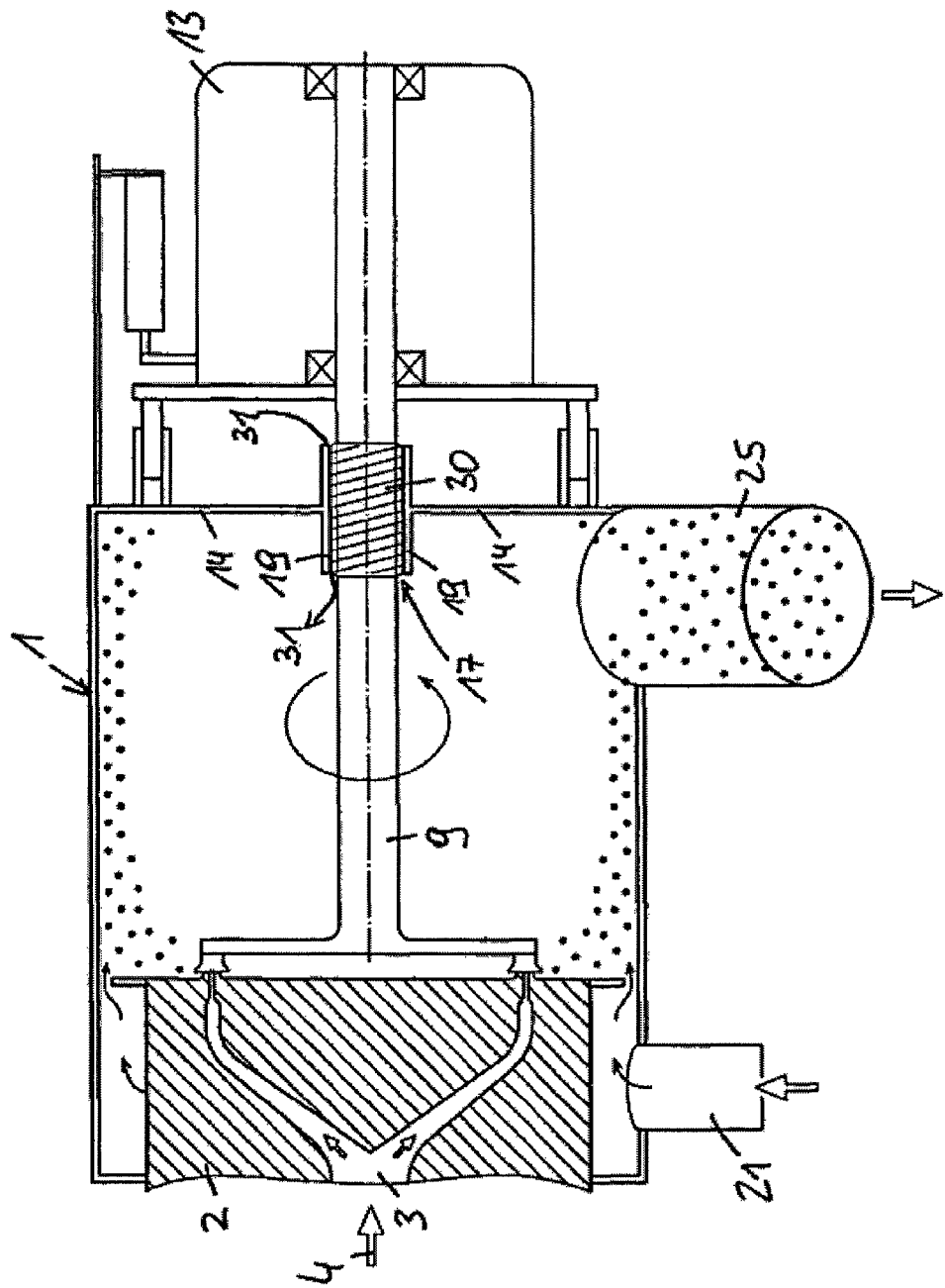
FIG. 2 shows an alternative embodiment form of the apparatus.

In FIG. 2 a further advantageous alternative implementation of the apparatus is represented. This one coincides for the most part with the apparatus according to FIG. 1. On the end wall 14 in the interior of the granulating housing 1 in the area of the penetration of the shaft 9 into the granulating housing 1 is however disposed a flange element 19 that encompasses the shaft 9 in a ring-shaped manner, wherein the flow-through opening 17 is implemented in this flange element 19 and surrounds the shaft 9 in a cylinder casing shape or cylinder-shaped manner from all sides. The shaft 9 touches neither the granulating housing 1 nor the flange element 19 and runs as such completely contact-less and therefore friction-free and wear-free and spaced apart from the granulating housing 1 and/or the flange element 19.

In the flow-through opening 17 and namely surrounded by the flange element 19 a back-flow thread 30 that encompasses the shaft 9 in a cylinder casing shape or cylinder-shaped manner is disposed. This back-flow thread 30 abuts in contact-less manner spaced apart or at best slightly dragging against the shaft 9 and conveys toward the interior in the direction of the granulating housing 1. By these means residual water can be removed or a type of failure protection is created, in case the vacuum in the granulating housing 1 is too low or fails intermittently. The air through-flow is not significantly impeded by the back-flow thread 30 or a permanently open flow-through opening 17 is still provided.

The granulating housing 1 is designed in such a manner that possible leaks of the granulating housing 1 are so minor that during operation sufficient air is always drawn into the interior of the granulating housing 1 and a sufficiently strong air current is provided through the flow-through opening 17 in order to prevent an escape or penetration of water through the flow-through opening 17. In particular it is advantageous if the granulating housing 1 is implemented during operation, aside from the flow-through opening 17 and the supply and discharge lines 21, for the cooling medium, in a gas tight manner.

The invention claimed is:

1. An apparatus for hot cut granulation of material, configured for strands of the material which has been melted in an extruder to be introduced thereto, comprising:
   a granulating housing configured for the strands to be introduced into the granulating housing;
   a rotatable shaft;
   rotatable knives disposed in the granulating housing and disposed on the shaft, wherein the rotatable knives are configured to cut the strands into granulate particles;
   a coolant inlet and a coolant outlet, configured for coolant to flow through the granulating housing in such a way that the granulate particles are picked up and cooled by the coolant, and the granulate particles are discharged from the granulating housing through the coolant outlet along with the coolant; and
   a flow-through opening, wherein the shaft penetrates the granulating housing through the flow-through opening, wherein the flow-through opening abuts immediately against the shaft, and wherein the flow-through opening establishes a fluid connection between an interior of the granulating housing and an ambient atmosphere of the apparatus, wherein, during operation, a pressure interior of the granulating housing is at a vacuum in comparison with the ambient atmosphere of the apparatus, wherein the vacuum acts to draw in air from the ambient atmosphere to thereby create an air current such that the air current enters the granulating housing through the flow-through opening at a rate to prevent any of the coolant from exiting the granulating housing through the flow-through opening, such that the air current creates a seal against the escape the coolant from the flow-through opening.

2. The apparatus according to claim 1, further comprising a motor configured to rotate the shaft.

3. The apparatus according to claim 1, the apparatus being configured such that the vacuum is at least partly created by a flow of the coolant.

4. The apparatus according to claim 1, wherein the shaft is axially adjustable or displaceable in a direction of a longitudinal axis thereof.

5. The apparatus according to claim 1, wherein the flow-through opening completely and on all sides surrounds the shaft.

6. The apparatus according to claim 2, wherein at least one of the shaft or the motor is supported outside of the granulating housing.

7. The apparatus according to claim 1, further comprising a flange element in the interior of the granulating housing, wherein the flange element encompasses the shaft, wherein the flow-through opening is disposed in the flange element and surrounds the shaft.

8. The apparatus according to claim 1, wherein the flow-through opening provides permanent fluid connection between the interior of the granulating housing and the ambient atmosphere of the apparatus.

9. The apparatus according to claim 1, further comprising a back-flow thread disposed in the flow-through opening, wherein the back-flow thread conveys toward the interior and encompasses the shaft.

10. The apparatus according to claim 3, wherein a velocity of the coolant is adjustable, to thereby create the vacuum at a predetermined negative pressure.

11. The apparatus according to claim 1, wherein the granulating housing is substantially hermetically sealed aside from the flow-through opening and supply and discharge lines for the coolant and the material.

12. The apparatus according to claim 1, wherein the shaft is supported outside of the granulating housing.

13. The apparatus according to claim 1, further comprising a vacuum pump configured to create the vacuum.

* * * * *